United States Patent
Timon

(10) Patent No.: US 6,457,775 B2
(45) Date of Patent: Oct. 1, 2002

(54) BASE FOR A VEHICLE SEAT AND SEAT INCLUDING SUCH A BASE

(75) Inventor: Michel Timon, Fleury-sur-Orne (FR)

(73) Assignee: Faurecia Sieges d'Automobile S.A., Boulogne (FR)

( * ) Notice: Subject to any disclaimer, the term of this patent is extended or adjusted under 35 U.S.C. 154(b) by 0 days.

(21) Appl. No.: 09/761,515

(22) Filed: Jan. 16, 2001

(30) Foreign Application Priority Data

Jan. 18, 2000 (FR) .............................. 00 00587

(51) Int. Cl.[7] ............................ F16M 13/00; A47C 1/02
(52) U.S. Cl. ................... 297/344.11; 248/429; 248/430
(58) Field of Search ................ 248/429, 430; 297/344.11

(56) References Cited

U.S. PATENT DOCUMENTS

| | | | | |
|---|---|---|---|---|
| 4,629,254 A | * | 12/1986 | Stolper et al. | 248/430 X |
| 4,652,052 A | * | 3/1987 | Hessler et al. | 248/430 X |
| 4,898,356 A | * | 2/1990 | Pipon et al. | 248/429 |
| 4,958,799 A | * | 9/1990 | Clauw et al. | 248/430 |
| 5,082,228 A | * | 1/1992 | Shimazaki | 248/430 |
| 5,425,522 A | * | 6/1995 | Retzlaff | 248/429 |
| 5,785,291 A | * | 7/1998 | Chang | 248/430 X |
| 5,964,442 A | * | 10/1999 | Wingblad et al. | 248/429 |
| 6,328,272 B1 | * | 12/2001 | Hayakawa et al. | 248/429 |

FOREIGN PATENT DOCUMENTS

| | | |
|---|---|---|
| DE | 42 20 347 | 2/1993 |
| DE | 2 777 836 | 11/1999 |
| FR | 2 777 835 | 10/1999 |
| GB | 829449 | 3/1960 |

\* cited by examiner

*Primary Examiner*—Rodney B. White
(74) *Attorney, Agent, or Firm*—Marshall, Gerstein & Borun

(57) ABSTRACT

Base for vehicle seat comprising two slide rails and two pivoted transverse shafts each supported by the two slide rails, these control shafts being rigidly fixed respectively to two control levers actuated simultaneously to pivot in two opposed actuating directions. The control shafts are rigidly fixed respectively to two control means, which are able to unlock the two slide rails respectively when the control shafts pivot respectively in their actuating directions from their rest positions.

10 Claims, 3 Drawing Sheets

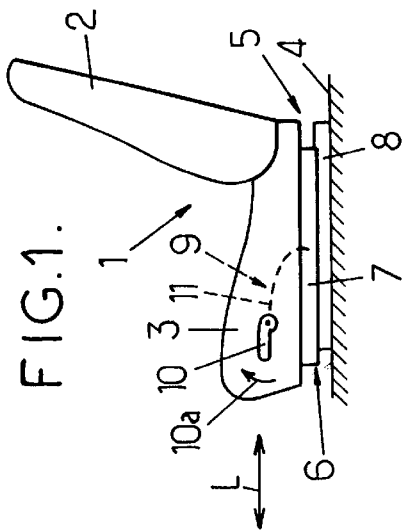
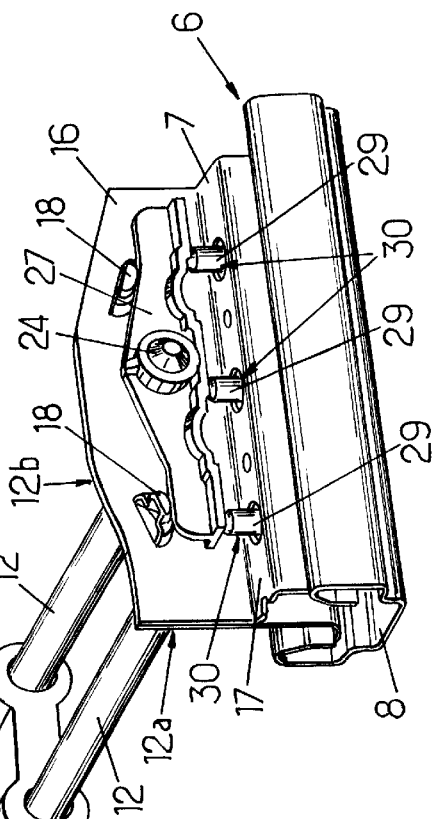
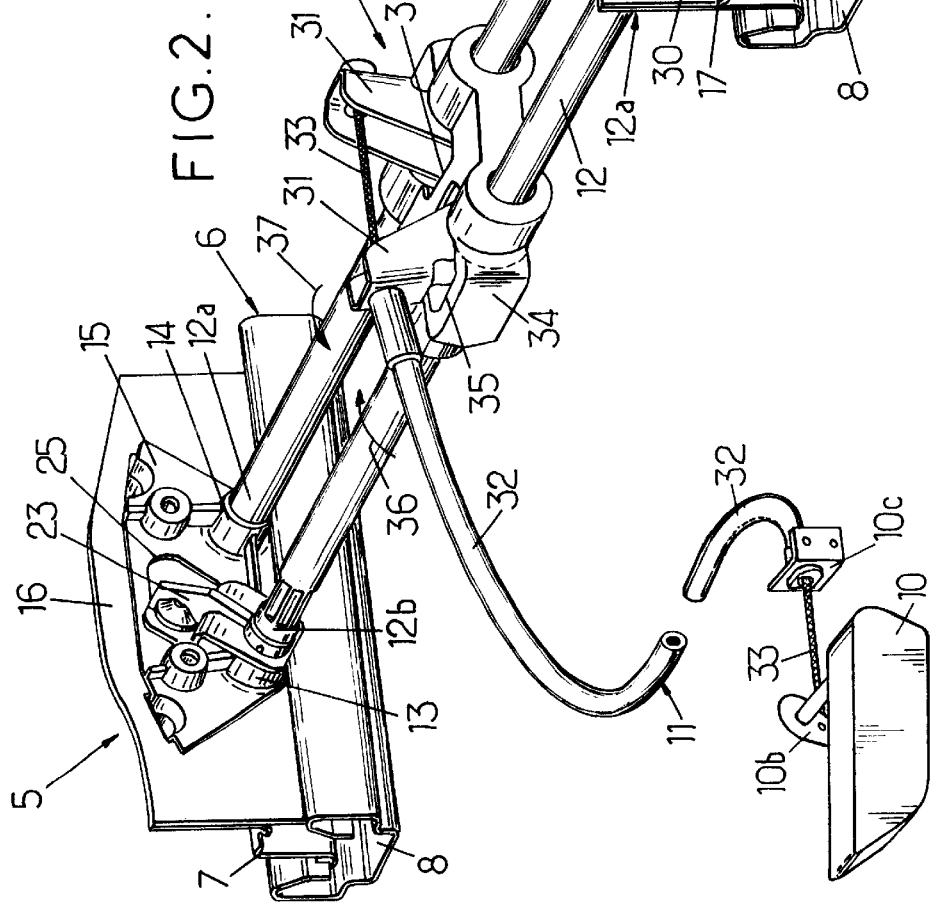
FIG.1.
FIG.2.

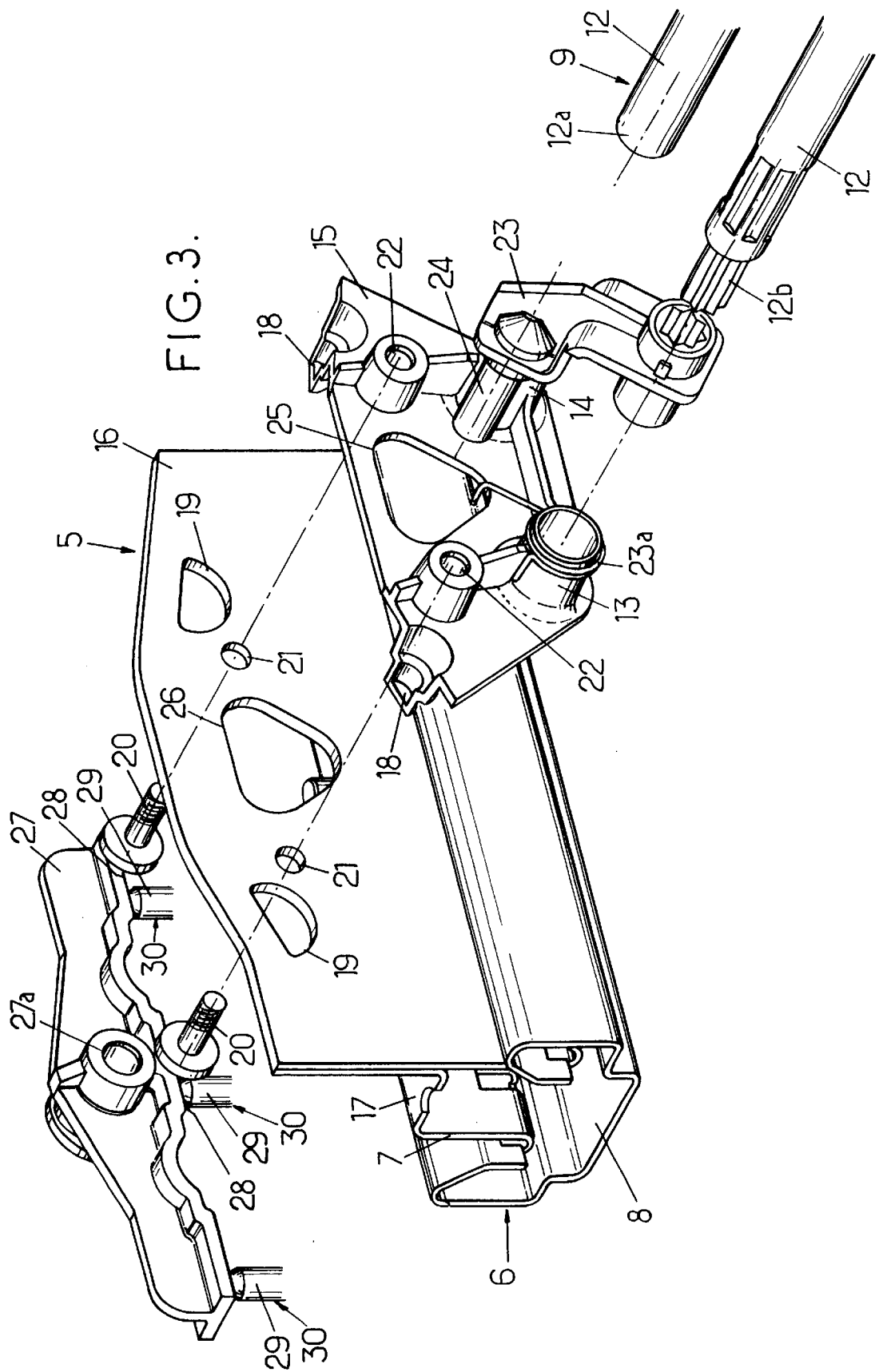

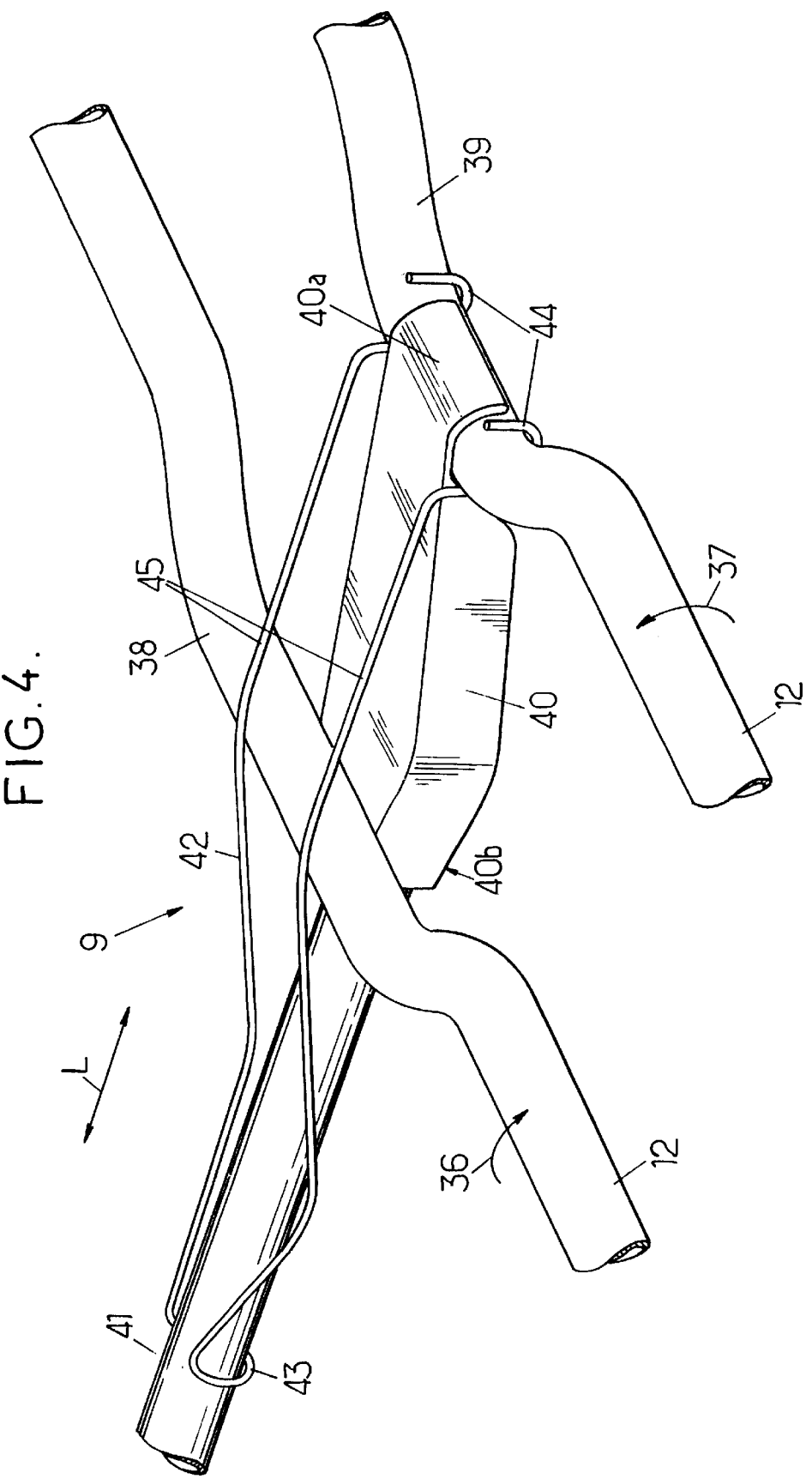

BASE FOR A VEHICLE SEAT AND SEAT INCLUDING SUCH A BASE

FIELD OF THE INVENTION

The present invention concerns bases for vehicle seats and seats including such bases.

More particularly, the invention concerns a vehicle seat base comprising:

first and second slide rails each comprising first and second elements mounted slidingly in relation to each other in a longitudinal direction, one of which is intended to be fixed to the seat and the other to the vehicle, the first element having at least one locking device moveable between:

firstly, a locked position in which said locking device engages with the second element of the slide rail so as to lock the first and second elements relatively to each other, and secondly, an unlocked position in which said locking device allows the first and second elements to slide relatively to each other, each locking device being loaded elastically towards its locked position, and a control device able to simultaneously move the locking device of the first and second slide rails to their unlocked position, this control device including operating means which can be actuated by a user so as to act simultaneously on first and second control means which are themselves able to unlock the two locking devices respectively.

BACKGROUND OF THE INVENTION

The document FR-A-2 777 836 describes an example of such a base which is fully satisfactory with regard to its operation but requires the use of slide rails the moving sections of which have a rather wide upper web, since the slide rails are unlocked by means of a sliding runner which moves horizontally, perpendicularly to the longitudinal direction of said slide rails. This base according to the prior art therefore has the disadvantage of having a control device incompatible with slide rails which have a narrow upper web.

OBJECTS AND SUMMARY OF THE INVENTION

The objective of the present invention is, in particular, to mitigate this disadvantage.

To achieve this objective according to the invention a seat base of the type in question is essentially characterized in that the control device includes first and second pivoted transverse shafts each of which is supported at its two ends respectively by the first elements of the first and second slide rails, each of these first and second control shafts being rigidly connected to one of the control means and being so connected to the control device that actuation of the operating means moves each of the first and second control shafts in a direction corresponding to the unlocking of the locking devices of the two slide rails.

As a consequence of these arrangements the unlocking of the slide rails does not involve the moving of a control means in the transverse horizontal direction, so that, if required, slide rails with a narrow upper web can be used within the framework of the present invention.

In addition, because of its differential effect, the control device of the base according to the invention is able:

to adapt itself to slightly differing unlocking movements between the locking devices of the first and second slide rails, taking account of the manufacturing tolerances of the assembly, and to adapt itself automatically to the distribution of the force applied to the locking devices of the two slide rails, resulting from the resistance offered by these locking devices to the unlocking movement (for example, if the locking device of one slide rail is slightly blocked during its unlocking movement, the locking device of the other slide rail continues its unlocking movement to the end, after which the force applied by the user is wholly exerted on the blocked locking device, which is generally sufficient to unblock this locking device).

In the preferred embodiments of the invention, one and/or the other of the following arrangements can be used as appropriate:

the control device includes a cable which runs in a non-rectilinear flexible sheath which is controlled by said operating means, the first and second control shafts being rigidly connected to first and second control levers respectively (these may be levers mounted on the control shafts or cranked or U-shaped parts forming part of these shafts), one of which is fixed to the control cable and the other to its sheath and are able to move the first and second control shafts respectively in first and second opposed directions of rotation starting from a rest position when the operating means is actuated;

the operating means comprises an operating lever which extends in the longitudinal direction and is linked to first and second cranks forming part of the first and second control shafts respectively, this operating lever being connected to at least one of the first and second cranks with a certain free play in the longitudinal direction, and these two cranks being orientated in the same direction so that when the operating lever swivels vertically the first and second control shafts swivel respectively in first and second opposed directions of rotation;

the operating lever is pivoted on the second crank but simply passes under the first crank, this operating lever being loaded upwardly against the first crank by a wire bending spring which has:

a first longitudinal end passing underneath the operating lever at a location towards the front of the first and second control shafts, a second longitudinal end fixed to the second crank, an intermediate portion which passes above the first crank;

the first and second control shafts are loaded elastically towards their rest positions;

each of the first and second slide rails includes several locking devices each one of which includes a thruster, each of the first and second control means having the form of a connecting arm which pivots with the corresponding control shaft and is articulated to an equalizing bar which is arranged to press on the thrusters of the different locking devices of the corresponding slide rails when the operating means is actuated by a user: this arrangement allows a differentiated force to be applied to the different locking devices of the same slide rail and can adapt itself to differing unlocking movements between the locking devices of the same slide rail;

the first element of each slide rail is constituted by a fixed section able to the fixed rigidly to the vehicle while the second element of each slide rail is constituted by a moving section which is able to be fixed rigidly to the seat and which slides on the fixed section;

the moving section of each slide rail includes a horizontal upper web extended upwardly by a vertical wall which supports the control shafts;

the vertical wall extending from the horizontal upper web of each slide rail has a bracket on which the control shafts are pivoted.

In addition, a further objective of the invention is to provide a vehicle seat including a cushion supported by a base as defined above.

BRIEF DESCRIPTION OF THE DRAWINGS

Other characteristics and advantages of the invention will emerge in the course of the following description of two of its embodiments, which are given as non-limiting examples, with reference to the attached drawings.

In the drawings:

FIG. 1 is a schematic view of a vehicle seat including a sliding base according to a first embodiment of the invention, FIG. 2 is a partial perspective view of the sliding base of the seat in FIG. 1, FIG. 3 is an exploded detail view of the base in FIG. 2, and FIG. 4 is a perspective detail view of the operating device of the slide rails, in a second embodiment of the invention.

MORE DETAILED DESCRIPTION

In the different figures the same references refer to identical of similar elements.

FIG. 1 shows a vehicle seat 1, in particular a front seat of a motor vehicle, which includes a backrest 2 supported by a cushion 3.

The cushion 3 is mounted on the floor 4 of the vehicle by the intermediary of a sliding base 5 which includes two slide rails 6 allowing the cushion 3 to slide horizontally forwards or backwards in a longitudinal direction L.

Each of the slide rails 6 comprises first and second elements 7,8 which in the example shown are formed by a moving metal section and by a fixed metal section inserted one inside the other end fixed respectively to the seat cushion and to the floor 4 of the vehicle.

Each moving section 7 is mounted slidingly on the corresponding fixed section 8 but is normally locked in position with respect to the fixed section by means of the locking system which will be described hereinafter and which is actuated by a control device 9 comprising a handle 10 or other operating means movable in the direction of the arrow 10a to control the unlocking of the slide rails by means of a flexible, non-rectilinear sheathed cable 11.

As shown in FIGS. 2 and 3, the control device 9 comprises two rigid transverse shafts 12, the two ends of each shaft 12 being pivoted respectively in bearings 13, 14 attached to a rigid support 15.

In the example shown, the rigid support 15 has the form of a molded plastic plate which is arranged vertically and is attached rigidly to a vertical wall 16 extending upwardly from the horizontal upper web 17 of the moving section of the corresponding slide rail. The rigid fixing between the support 15 and the vertical wall 16 can be obtained in particular by the engaging of two projections 18 of the support 15 in corresponding openings 19 in the wall 16 and by the fixing of two screws or rivets 20 in two corresponding openings 22 in support 15, these screws or rivets 20 passing through holes 21 in wall 16.

In addition each of the control shafts 12 includes:

one smooth circular end 12a which pivots freely in bearing 14 of support 15 attached to one of the slide rails 6, and one splined end 12b which engages in one end of a rigid connecting arm 23, which itself pivots freely in bearing 13 of support 15 attached to the other slide rail 6.

The free end of each connecting arm 23 is rigidly fixed to a transverse horizontal control pin extending parallel to control shafts 12 and passing through openings 25, 26 formed respectively in support 15 and in a vertical wall 16 of the corresponding slide rail.

The control pin 24 attached to connecting arm 23 of each control shaft 12 engages in a circular recess 27a formed in one equalizing bar 27, which equalizing bar is thus pivoted with respect to the control pin 24.

This equalizing bar 27 has lower pressure surfaces 28 arranged respectively above vertical thrusters 29 which pass through the upper horizontal web 17 of the corresponding slide rail, each of which thrusters forms part of a slide rail locking device 30, these locking devices 30 being, for example, three in number for each slide rail.

Each locking device of the slide rail 30 is carried by the moving section 7 and is elastically loaded upwardly towards a locked rest position in which this locking device engages with fixed profile 8 of the corresponding slide rail to block this slide rail, and can be moved downwardly by pressure of the pressure surfaces 28 of the equalizing bar on the thrusters 29, up to an unlocked position where said locking device allows slide rail 6 to slide. Each of the connecting arms 23 is loaded by a spring 23a towards a rest position in which the corresponding equalizing bar 27 allows the locking devices 30 to remain in the locked position.

The locking devices 30 may in particular be of the same type as those disclosed in the above-mentioned document FR-A-2 777 836.

In addition, each of the control shafts 12 is rigidly fixed to a lever 31 extending upwardly, one of these levers 31 being fixed to one end of the sheath 32 of the sheathed cable 11 while the other lever 31 is fixed to one end of cable 33 itself surrounded by sheath 32. The other end of cable 33 is fixed, for example, to a lever 10b rigidly fixed to the handle 10, while the other end of sheath 32 is fixed to an arm 10c attached to the frame of the cushion 3 of the seat.

Advantageously, each of the levers 31 can be arranged inside a housing 35 of a plastic guide 34 through which shafts 12 pass and which is supported by these shafts.

When a user actuates handle 10 described previously, the sheath 32 and the cable 33 apply a force to levers 31 so as to move them towards each other, thus causing control shafts 12 to pivot in two opposite actuating directions 36, 37, and also causing the connecting arms 23 fixed to the two control shafts to rotate so as to move the equalizing bars 27 of the two slide rails downwardly and to actuate the thrusters 29 of the locking devices 30 to unlock the slide rails.

In the course of this actuation, the differential action of control device 9 allows the forces applied to the two equalizing bars 27 to be balanced and to be adapted to slightly different movements of these equalizing bars. In addition, each of the equalizing bars itself has a balancing effect on the forces applied to locking devices 30 of the same slide rail 6, and allows slightly differing locking movements between the locking devices to be accommodated.

The slide rails 6 therefore remain unlocked while the user continues to actuate handle 10; however, once the user releases handle 10, each connecting arm 23 is returned to its rest position by the corresponding spring 23a, and the locking devices of slide rail 30 are also elastically returned to their locked position, so that the slide rails are again blocked.

The second embodiment of the invention illustrated in FIG. 4 is similar to the first embodiment and therefore will not be described in detail.

This second embodiment differs from the first embodiment by its control device 9 which, instead of handle 10 and sheathed cable 11, includes an operating lever 40, 41. In the example shown, this lever is formed by a plastic part 40 in which a metal sleeve 41 is pressed-fitted, which sleeve extends under the seat cushion in the longitudinal direction L up to the front of the seat, so as to be accessible to a user.

The plastic part 40 of the operating lever is clipped at its rearward end 40a above a crank 39 formed by a U-bend in the rear control shaft 12, but at location 40b simply passes under a crank 38 formed by a U-bend in the front control shaft 12, with a possibility of sliding in the longitudinal direction between crank 39 and part 40. The two cranks 38, 39 are orientated towards the front.

In addition, operating lever 40, 41 is loaded upwardly against crank 38 by a wire bending spring 42 which has:
- a first longitudinal end 43 formed as a U-bend which passes underneath sleeve 41 at a point located towards the front of the two control shafts 12,
- a second longitudinal end which forms two U-shaped hooks 44 each facing upwardly and clipped under the crank 39,
- and an intermediate portion 45 passing above the first crank 38.

Thus, when the user pivots the sleeve 41 of the operating lever upwards, the control shafts 12 pivot respectively in their opposed actuating directions 36, 37 and unlock the two slide rails 6, in the same way as in the first embodiment of the invention.

Moreover, if a user accidentally presses down on the sleeve 41 instead of moving it upwardly, this incorrect action does not risk damaging plastic part 40 or any other part of the actuating device 9, since sleeve 41 can then pivot downwardly thanks to the flexibility of spring 42, then return to its rest position under the effect of this spring.

I claim:

1. Base for a vehicle seat, comprising:
   first and second slide rails each comprising first and second elements mounted slidingly in relation to each other in a longitudinal direction, one of which is intended to be fixed to the seat and the other to the vehicle, the first element having at least one locking device moveable between:
      firstly, a locked position in which said locking device engages with the second element of the slide rail so as to lock the first and second elements relatively to each other,
      and secondly, an unlocked position in which said locking device allows the first and second elements to slide relatively to each other, each locking device being loaded elastically towards its locked position,
   and a control device able to simultaneously move the locking device of the first and second slide rails to their unlocked position, said control device including operating means which can be actuated by a user so as to act simultaneously on first and second control means which are themselves able to unlock the two locking devices respectively, wherein the control device includes:
   a first pivoting control shaft which extends substantially perpendicular to the longitudinal direction and which is supported at its two ends respectively by the first elements of the first and second slide rails,
   a second pivoting control shaft which extends substantially perpendicular to the longitudinal direction and which is supported at its two ends respectively by the first elements of the first and second slide rails, each of said first and second control shafts being rigidly connected to one of the control means and being so connected to the control device that actuation of the operating means moves each of the first and second control shafts in a direction corresponding to the unlocking of the locking devices of the two slide rails.

2. Base according to claim 1, in which the control device includes a cable which runs in a non-rectilinear flexible sheath and is controlled by said operating means, the first and second control shafts being rigidly connected to first and second control levers respectively, one of which is fixed to the control cable and the other to its sheath, and which are able to move the first and second control shafts respectively in first and second opposed directions of rotation starting from a rest position when the operating means is actuated.

3. Base according to claim 1, in which the operating means comprises an operating lever which extends in the longitudinal direction and is linked to first and second cranks forming part of the first and second control shafts respectively, said operating lever being connected to at least one of the first and second cranks with a certain free play in the longitudinal direction, and these two cranks being orientated in the same direction so that when the operating lever swivels vertically the first and second control shafts swivel respectively in first and second opposed directions of rotation.

4. Base according to claim 3, in which the operating lever is fixed to the second crank but simply passes under the first crank, said operating lever being biased upwardly against the first crank by a wire bending spring which has:
   a first longitudinal end passing underneath the operating lever at a position towards the front of the first and second control shafts,
   a second longitudinal end fixed to the second crank,
   and an intermediate portion which passes above the first crank.

5. Base according to claim 1, in which the first and second control shafts are loaded elastically towards the rest positions.

6. Base according to claim 1, in which each of the first and second slide rails includes several locking devices each of which includes a thruster, each of the first and second control means having the form of a connecting arm which pivots with the corresponding control shaft and is articulated to an equalizing bar which is arranged to press on the thrusters of the different locking devices of the corresponding slide rails when the operating means is actuated by a user.

7. Base according to claim 1, in which the second element of each slide rail is constituted by a fixed section able to the fixed rigidly to the vehicle while the first element of each slide rail is constituted by a movable section which is able to be fixed rigidly to the seat and which slides on the fixed section.

8. Base according to claim 7, in which the movable section of each slide rail includes a horizontal upper web extended upwardly by a vertical wall which supports the first and second control shafts.

9. Base according to claim 8, in which the vertical wall extending from the horizontal upper web of each slide rail has a bracket on which the first and second control shafts are pivoted.

10. Vehicle seat including a cushion supported by a base according to claim 1.

* * * * *